US011855713B2

United States Patent
Cordier

(10) Patent No.: US 11,855,713 B2
(45) Date of Patent: Dec. 26, 2023

(54) METHOD FOR IMPLEMENTING AN NFC TRANSACTION

(71) Applicant: STMICROELECTRONICS (ROUSSET) SAS, Rousset (FR)

(72) Inventor: Nicolas Cordier, Aix-en-Provence (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 1 day.

(21) Appl. No.: 17/701,416

(22) Filed: Mar. 22, 2022

(65) Prior Publication Data

US 2022/0311476 A1    Sep. 29, 2022

(30) Foreign Application Priority Data

Mar. 25, 2021 (FR) ..................... 2103038

(51) Int. Cl.
*H04B 5/00* (2006.01)
*H04B 17/318* (2015.01)

(52) U.S. Cl.
CPC ......... *H04B 5/0031* (2013.01); *H04B 17/318* (2015.01)

(58) Field of Classification Search
CPC .. H04B 5/0031; H04B 17/318; H04B 5/0068; H04B 5/0056; H04W 4/80; H04W 52/0245; G06K 17/0022
USPC ..................................................... 455/41.1
See application file for complete search history.

(56) References Cited

U.S. PATENT DOCUMENTS

| | | |
|---|---|---|
| 2013/0005242 A1 | 1/2013 | Royston |
| 2013/0084798 A1 | 4/2013 | Faithorn |
| 2017/0064647 A1* | 3/2017 | Debates ............. G06K 7/10207 |
| 2018/0240097 A1 | 8/2018 | Chauvin et al. |
| 2020/0235968 A1* | 7/2020 | Luzzi ................. H04L 27/3881 |

OTHER PUBLICATIONS

International Standard, "Information technology—Telecommunications and information exchange between systems—Near Field Communication—Interface and Protocol (NFCIP-1)," Reference No. ISO/IEC 18092:2013(E), Mar. 15, 2013, 52 pages.

* cited by examiner

*Primary Examiner* — Eugene Yun
(74) *Attorney, Agent, or Firm* — SEED IP LAW GROUP LLP

(57) ABSTRACT

The present disclosure relates to a method implemented by a first NFC device, wherein the establishment of a transaction with a second NFC device configured in reader mode is performed when the signal level received by the first device, configured in card mode, reaches a first threshold, depending on the type of modulation technology of the second device.

17 Claims, 4 Drawing Sheets

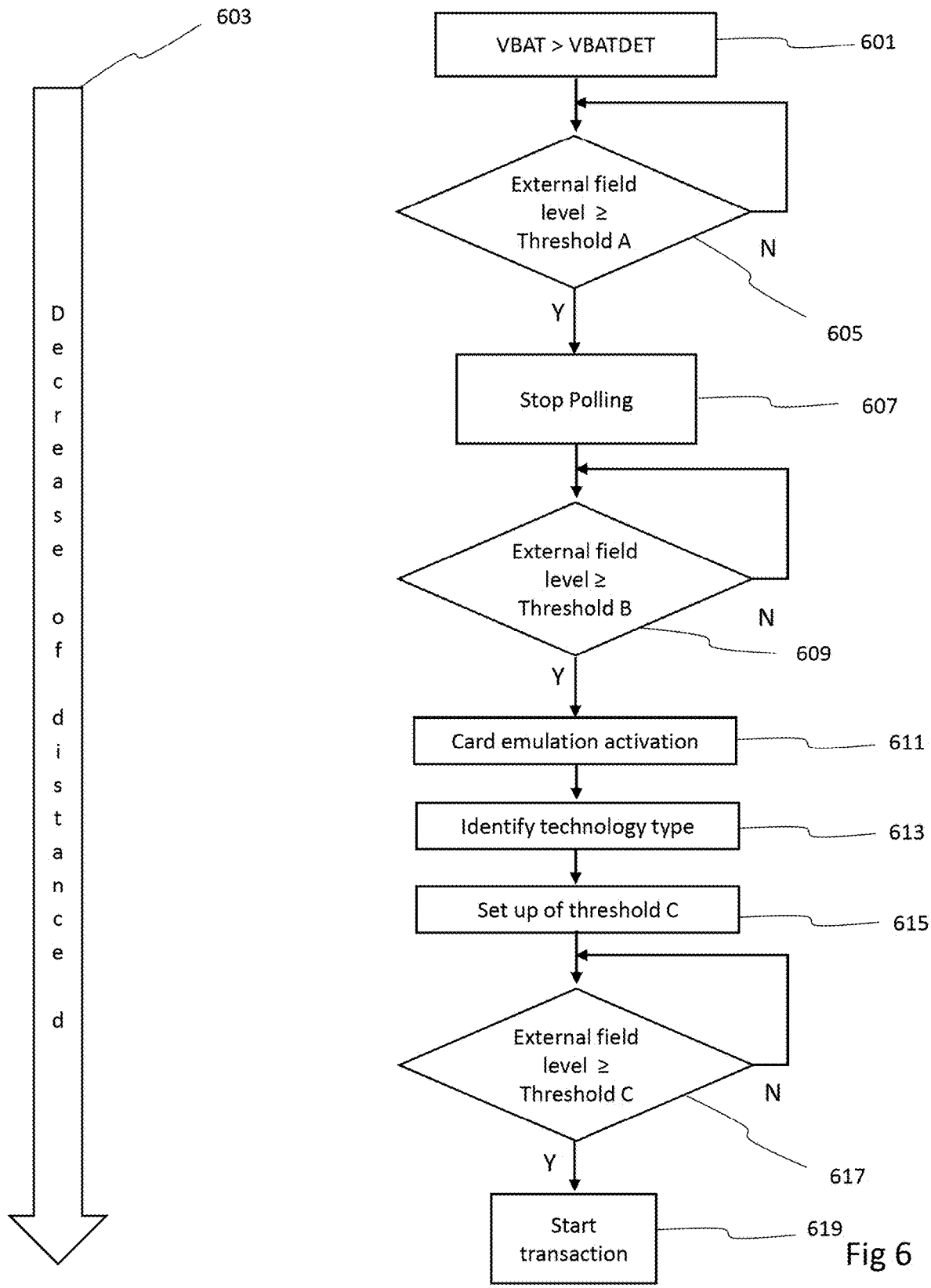

METHOD FOR IMPLEMENTING AN NFC TRANSACTION

CROSS REFERENCE TO RELATED APPLICATION(S)

This application claims the priority benefit of French patent application number 2103038, filed on Mar. 25, 2021, entitled "Procédé de mise en oeuvre d'une transaction NFC" (Method for implementing an NFC transaction).

BACKGROUND

Technical Field

The present disclosure relates generally to electronic circuits and, more particularly, to electromagnetic transponders or electronic tags.

The present disclosure applies in particular to electronic devices incorporating Near-Field Communication (NFC) circuitry, more commonly known as NFC devices, and to the detection of the presence of such a device in the field of another device.

Description of the Related Art

Electromagnetic transponder-based communication systems are becoming increasingly common, particularly since the development of near-field communication technologies. These systems typically exploit a radio frequency electromagnetic field generated by an NFC device (e.g., terminal or reader) to detect and then communicate with another NFC device (e.g., card) within range.

BRIEF SUMMARY

One or more embodiments of the present disclosure provide improved NFC devices and their communication method.

One embodiment addresses all or some of the drawbacks of known NFC devices.

One embodiment provides a method implemented by a first NFC device, wherein the initiation of a transaction with a second NFC device configured in reader mode is performed when the signal level received by the first device, configured in card mode, reaches a first threshold, depending on the type of modulation technology of the second device.

In one embodiment, a first device is configured to initiate a transaction with a second NFC device configured in reader mode when the signal level received by the first device, configured in card mode, reaches a first threshold, depending on the type of modulation technology of the second device.

According to one embodiment, the initiation of the transaction is preceded by a step of determining, by the first device, the type of modulation technology of the second device.

According to one embodiment, the first threshold corresponds to a received signal strength indicator threshold.

According to one embodiment, a value of the first threshold, for each type of modulation technology of the second device, is stored in a non-volatile memory of the first device.

According to one embodiment, the initiation is preceded by the following steps:
  detection, by the first device, of a field emitted by the second NFC device configured in reader mode; and
  switching the first device to card mode when the received signal level reaches a second threshold.

According to one embodiment, the determining step occurs before the detecting step.

According to one embodiment, the second threshold is lower than the first threshold.

According to one embodiment, the second threshold corresponds to the threshold of ISO 14443 type B technology.

According to one embodiment, the second threshold corresponds to a threshold of FeliCa technology.

According to one embodiment, the first device exits an interrogation mode of its environment when the received signal level reaches a third threshold, lower than the second threshold.

According to one embodiment, the second device is of the ISO 14443B type, the first threshold corresponding to a minimum signal threshold for the initiation of a transaction in ISO 14443B technology.

According to one embodiment, the second device is of the ISO 14443A type, the first threshold corresponding to a minimum signal threshold for initiating a transaction in the ISO 14443A technology.

According to one embodiment, the second device is of the FeliCa 212 type, the first threshold corresponding to a minimum signal threshold for initiating a transaction in the FeliCa 212 technology.

According to one embodiment, the second device is of the FeliCa 424 type, the first threshold corresponding to a minimum signal threshold for initiating a transaction in the FeliCa 424 technology.

According to one embodiment, the first device is a smartphone.

According to one embodiment, the second device is a transport ticket reader terminal.

BRIEF DESCRIPTION OF THE SEVERAL VIEWS OF THE DRAWINGS

The foregoing features and advantages, as well as others, will be described in detail in the following description of specific embodiments given by way of illustration and not limitation with reference to the accompanying drawings, in which:

FIG. 6 represents a flowchart illustrating a transaction process between two NFC devices.

DETAILED DESCRIPTION

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front," "back," "top," "bottom," "left," "right," etc., or to relative positional qualifiers, such as the terms "above," "below," "higher," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Figure 1:
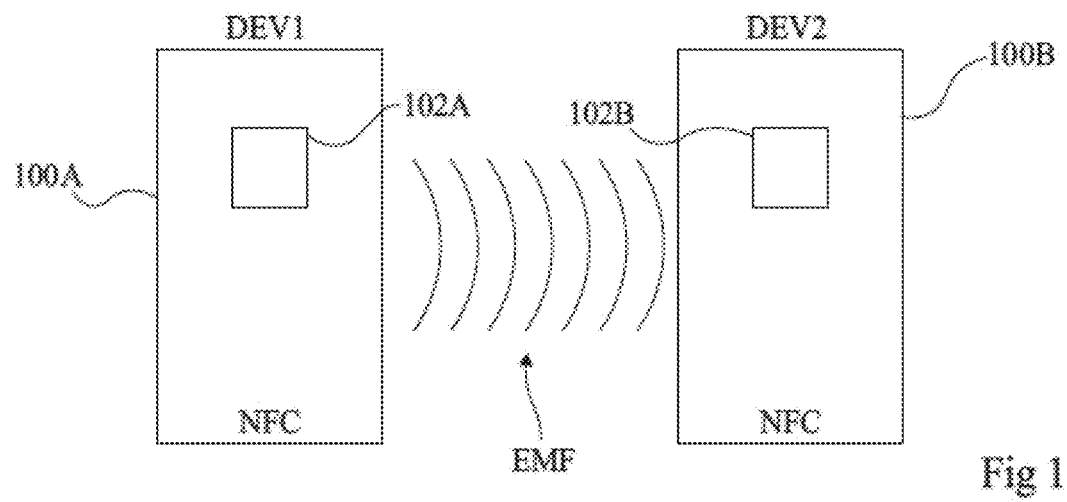
FIG. 1 represents, in a very schematic way and in block form, an example of a near field communication system of the type to which the described embodiments and implementation modes apply, by way of example.

FIG. 1 represents, very schematically and in block form, an example of a near field communication system of the type to which the described embodiments and implementations apply by way of example.

The case of two similar electronic devices, for example two cell phones, is arbitrarily assumed, but what is described applies more generally to any system in which a reader, terminal or terminal radiates an electromagnetic field that can be picked up by a transponder. For simplicity, we will refer to NFC devices as electronic devices incorporating one or more Near-Field Communication (NFC) circuits.

In the example represented, a first NFC device 100A (DEV1) is able to communicate, by electromagnetic coupling in the near field (e.g., electromagnetic field; EMF field), with a second NFC device 100B (DEV2). According to the applications, for a communication, one of the NFC devices 100A, 100B operates in a so-called reader mode while the other NFC device 100B, 100A operates in a so-called card mode, or the two NFC devices 100A and 100B communicate in a so-called peer-to-peer P2P mode.

Each NFC device 100A, 100B incorporates a near field communication circuit symbolized in FIG. 1 by a block 102A, 102B. The near-field communication circuits 102A and 102B each include various electronic elements or circuits for generating or detecting a radio frequency signal using an antenna (not represented), for example modulation or demodulation circuits.

Figure 2:
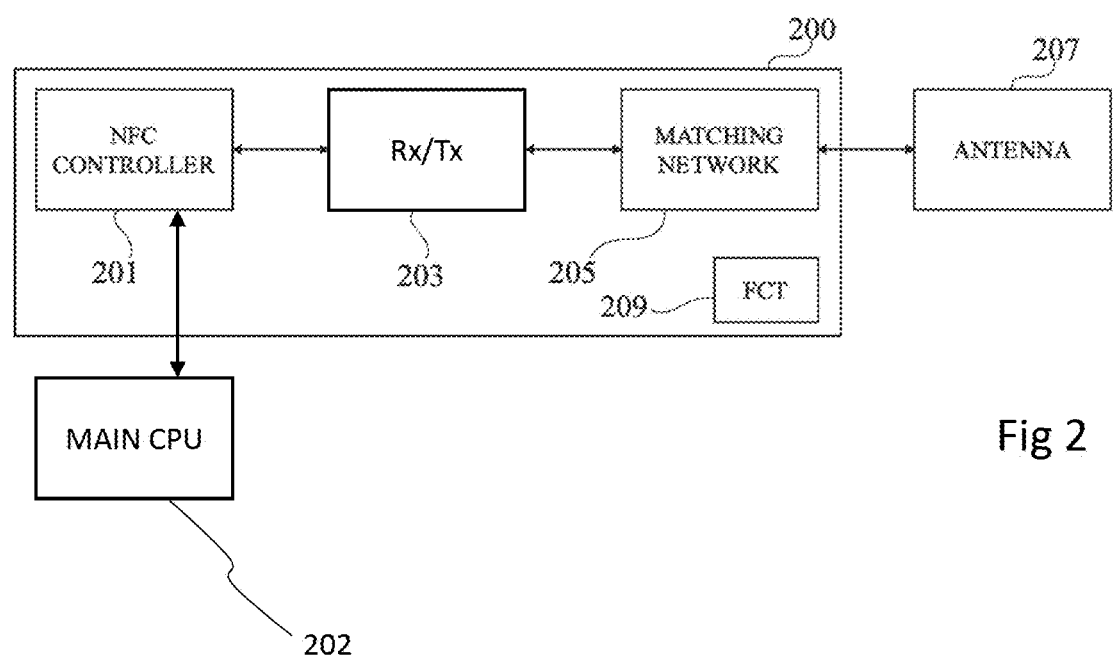
FIG. 2 represents, schematically and in block form, an example of a near field communication circuit.

FIG. 2 represents, schematically and in block form, an example of a near field communication circuit 200, wherein the example circuit 200 may be included in a device 100A, 100B as described relative to FIG. 1.

In the represented example, the circuit 200 includes a near field communication controller 201 (NFC CONTROLLER), or NFC controller. The NFC controller 201 is, for example, a microchip or electronic circuit able to implement near field communications.

In the represented example, the NFC controller 201 is connected to a central processing unit 202 (MAIN CPU). The MAIN CPU 202 is, for example, the CPU of the NFC device 100A, 100B and is, generally, in practice, a microcontroller. The term "connected" used herein includes the meaning of "physically connected," or "electrically connected," or "communicatively connected" according to the relevant embodiments described in the present disclosure. According to some embodiments, a connection may mean both "physically and electrically connected." In other embodiments, communicatively connected may mean that one or more components are connected using various communication schemes including wired communications, wireless communications such as NFC, WiFi, Bluetooth, cellular, or the like.

According to one embodiment not represented, the NFC controller 201 is connected to a secure element.

In the represented example, the NFC controller 201 is connected to a transmit/receive circuit 203 (Rx/Tx) or radiofrequency head. According to one embodiment, the controller 201 and the transmit/receive circuit 203 are part of the same integrated circuit. The transmit/receive circuit 203 is connected to an impedance matching circuit or network 205 (MATCHING NETWORK) including discrete external components, which in turn is connected to an antenna 207 (ANTENNA).

The transmit/receive circuit 203 is able to convert digital signals at the NFC controller end to modulated analog signals at the antenna end, and vice versa. The impedance matching circuit 205 is typically configured to increase or maximize the amplitude of signals that may be transmitted or received by the NFC controller 201. In general, the impedance matching circuit 205 is notably designed to match electrical properties of the antenna 207.

The near field communication circuit 200 may further include other elements, such as one or more volatile or non-volatile memories, or various circuits implementing other functions, symbolized in FIG. 2 by a single block 209 (FCT).

When communicating between NFC devices 100A and 100B (FIG. 1), the radio frequency signal generated by one of the NFC devices is picked up by the other NFC device found to be within range.

It is arbitrarily assumed, as illustrated in FIG. 1, that the first NFC device 100A emits an electromagnetic field (EMF) to initiate communication with the second NFC device 100B. The EMF field is picked up by the second NFC device 100B, and more specifically by its antenna 207. Coupling then occurs between the respective oscillating circuits of the NFC devices. This coupling results in a variation of the load constituted by the circuits of the NFC device 100B on the EMF field generating the oscillating circuit of the NFC device 100A.

In practice, for a communication, a corresponding variation in phase and/or amplitude of the emitted field is detected by the device 100A, which then initiates an NFC communication protocol with the device 100B.

Once the NFC device 100A has detected the presence of the NFC device 100B in its field, it initiates a communication establishment procedure involving transmissions of requests by the NFC device 100A and responses by the NFC device 100B.

In the applications targeted by the present disclosure, when an NFC device is not communicating, it is switched to a so-called low power mode, or sleep mode, to reduce power consumption. When an NFC device is in sleep mode, it is still able to detect the presence of a field generated by a reader (by being woken up by it). However, it does not transmit polling frames to detect a card within range.

Figure 3:
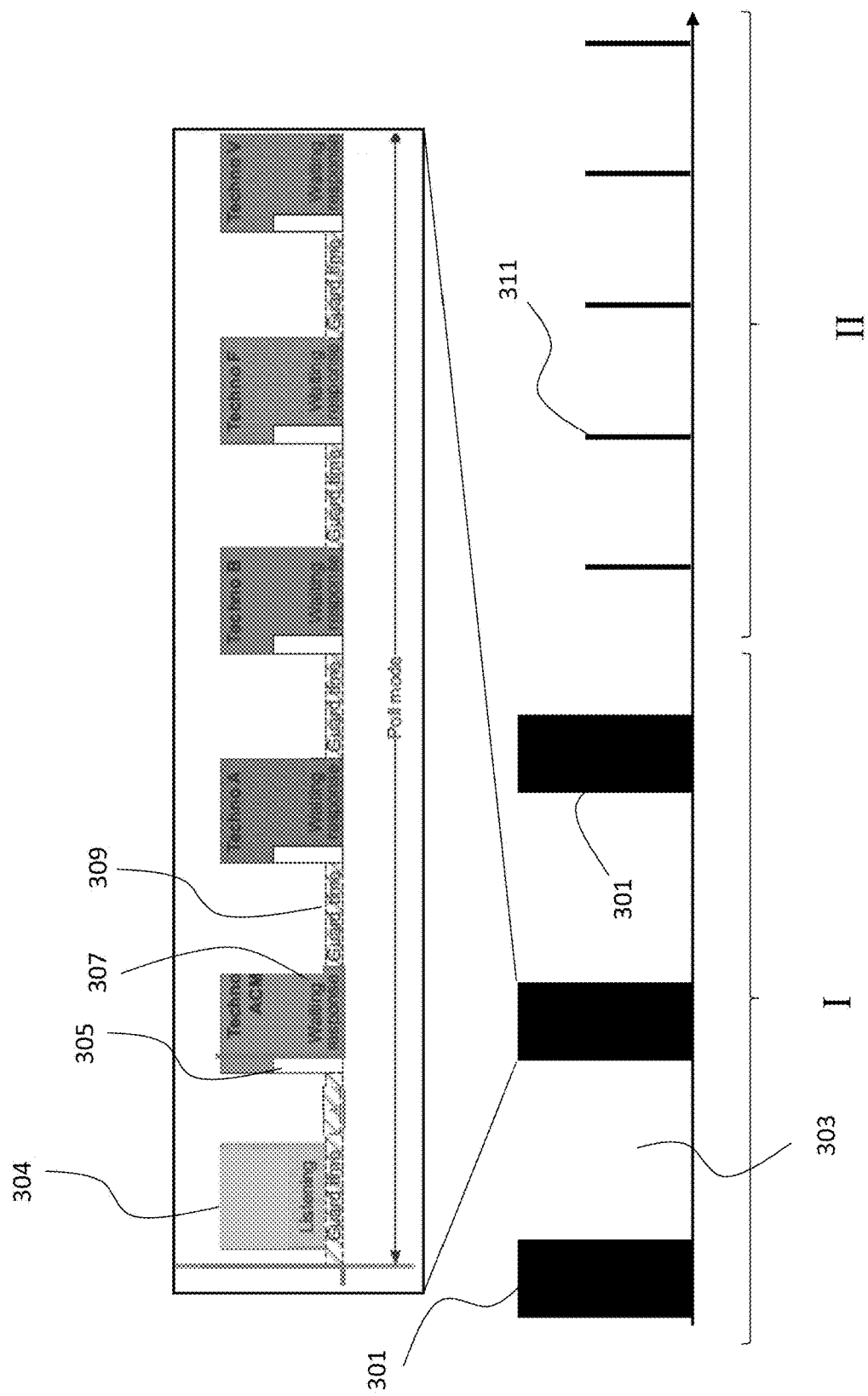
FIG. 3 represents a timing diagram illustrating an operating mode of an NFC device.

FIG. 3 represents a timing diagram illustrating one mode of operation of an NFC device.

The timing diagram represented in FIG. 3 comprises two successive parts I and II, part I corresponding to an operation when the poller is in normal mode and part II corresponding to an operation when the poller is in sleep mode.

According to the embodiment represented in FIG. 3, in normal mode (part I), the polling device transmits periodic polling frames 301, during which it generates a field to map mode devices that are within range (Poll mode). The frames 301 are spaced at intervals 303 during which the device is in listener mode for a device in reader mode that is within range.

For example, each frame 301 begins with an interrogation 304 (Listening) in which the sounder device interrogates its environment to determine if a Tag Talk First (TTF) card is within range.

The interrogation of the card is followed by several bursts 305. A single frame 301 is, for example, made up of a succession of five transmission bursts 305 each configured in a different type of modulation technology. In other words, during a frame 301, the sounder device successively implements five transmission bursts 305 each representative of a type of modulation technology. These bursts 305 indicate whether a card of the considered technology is within range.

In some embodiments, the types of technologies targeted by the bursts 305 are technologies of the Reader Talk First (RTF) type and are successively the ACM technology (Techno ACM), the two types A (Techno A) and B (Techno B) of ISO 14443 standard, type FeliCa 212 kbps or 424 kbps (Techno F) of ISO 18092 standard and the technology known as "Vicinity cards" or ISO 15693 standard (Techno V). For example, Type A is characterized by the reader using 100% amplitude Shift Keying (ASK) and modifies Miller bit encoding; and Type B is characterized by the reader using 10% amplitude shift keying and non-return to zero (NRZ) bit encoding.

Both types FeliCa 212 kbps and FeliCa 424 kbps correspond to the technology associated with ISO IEC 18092: 2013 "Information technology—telecommunication and information exchange between systems—Near Fields communication—interface and protocol (NFCIP-1)" in which:

The type FeliCa 212 kbps is characterized by the reader using 10% displacement amplitude modulation and Manchester bit encoding; and The type FeliCa 424 kbps is characterized by the fact that the reader uses 10% displacement amplitude modulation and Manchester bit coding and that the bit period is halved.

According to the implementation mode illustrated in FIG. 3, each of the transmission bursts 305 is followed by a waiting time 307 (Waiting response). During the waiting time 307, the sounder device waits for a response from an NFC device in its field. If the sounder device detects a response after one of the bursts 305, it means that a device of the technology in the burst is present in the field. If the sounder device does not detect a response after any of the bursts 305, it means that there is no device of the burst technology in the field.

Each of the five bursts 305 is preceded by a Guard time 309 during which the sounder device configures the protocol of the said burst 305 in the desired technology.

According to the embodiment illustrated in FIG. 3, when the device is in standby mode (part II), it "probes" its environment by short periodic transmission pulses 311. Two pulses 311 are, for example, separated by an interval 303 similar to that of normal mode operation. A pulse 311 corresponds to a short field emission by the sounder device to detect a possible device configured in card mode present in its field. In the event of such a detection, the sounder device then comes out of standby and switches to normal mode. The detection implements an analysis of the electrical quantities specific to these pulses such as the amplitude or the phase, these quantities varying if a device configured in card mode is nearby.

According to one embodiment, each frame 301 has a duration of between 60 ms and 80 ms and each pulse 311 has a duration of the order of 30 μs.

During the frames 301 and pulses 311, detection of a field emitted by a device configured in a proximity reader mode is impossible.

According to one example of application, the described embodiments are aimed at transport systems and, more particularly, at the validation of transport tickets stored in a telephone, for example a smartphone. Thus, in this example application, the first NFC device is a telephone and the second NFC device is a terminal for validating or reading transport tickets.

Figure 4:
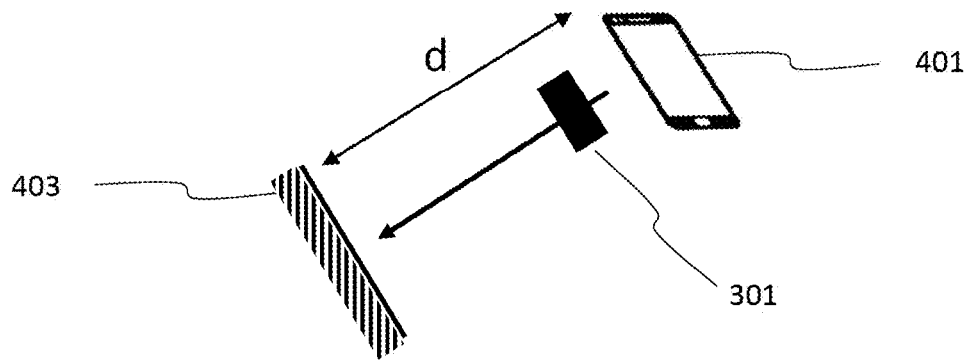
FIG. 4 illustrates, in a very schematic way, an operating mode of the near field communication system illustrated in FIG. 1.

FIG. 4 illustrates, in a very schematic way, a mode of operation of the near field communication system illustrated in FIG. 1.

More particularly, FIG. 4 illustrates a near field communication system comprising a telephone 401 and a validation terminal 403.

In practice, when validating a transport ticket, a user brings his phone 401, close to the validation terminal 403. The phone 401 is listening to its surroundings. The phone 401 implements the operation described in connection with FIG. 3.

It is assumed that the validation terminal 403 is within range of the phone 401 when the distance between the two devices is less than or equal to a distance d, e.g., it is assumed that the signal level from the validation terminal 403 received by the phone 401 exceeds a certain threshold hereinafter referred to as the standby threshold. The standby threshold is, for example, defined and stored in the internal memory of the phone 401.

However, even when in range of the terminal 403, the phone 401 cannot detect it during the frames 301. The detection of the validation terminal 403 by the telephone 401 is then delayed by a time approximately equal to that of a frame 301.

This delay causes a delay in establishing communication between the telephone 401 and the validation terminal 403.

To alleviate this problem, one might consider:
interrupting an interrogation frame 301 when the telephone 401 detects, outside of the transmission phases, a received signal strength greater than an anti-collision threshold (lower than the standby threshold).
switching the phone 401 to card mode and establishing a call when the phone 401 detects a received signal strength greater than a standby threshold; then
detecting the technology type of the terminal 403.

However, one would then be led to rely on the technology whose SNR (Signal-to-Noise Ratio), allowing to correctly decode any response received from the card, is the highest to calculate the standby threshold, the technology of the terminal 403 not being known at the time of the communication establishment. This would lead in practice to choosing the 14443-A technology.

The embodiments described below provide for avoiding the worst case selection and for setting the communication establishment threshold based on the technology type of the terminal 403.

Figure 5:
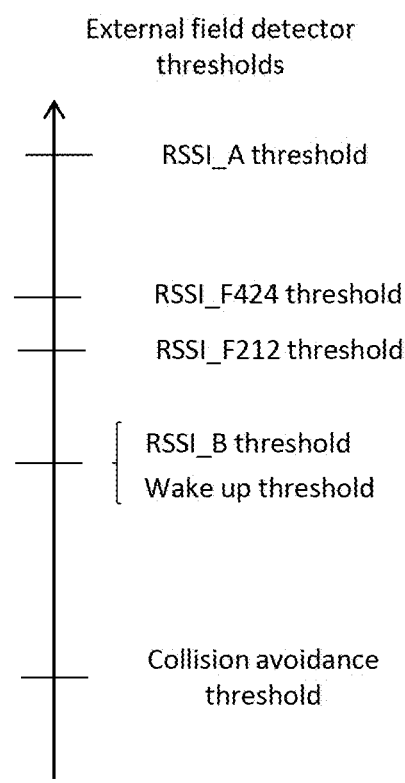
FIG. 5 illustrates very schematically the operation of the described embodiments.

FIG. 5 illustrates, in a very schematic manner, the operation of the described embodiments.

More particularly, the embodiments provide:
when the value of the detected external field (External field detector thresholds) exceeds a collision avoidance threshold, to interrupt the reader mode, which has the effect of preventing any field emission either according to a frame 301 or a frame 311 (FIG. 3) implemented by the telephone 401.

when the value of the detected external field exceeds a wake up threshold, to take the phone 401 (FIG. 4) out of the standby mode and to switch it into card mode, the wake up threshold being based on the FeliCa technology or the 14443-B technology.

determining the technology of the terminal 403 (FIG. 4).

setting a communication threshold based on the technology of the terminal 403; and when the value of the detected external field exceeds the previously set communication threshold (RSSI_B threshold, RSSI_F212 threshold, RSSI_F424 threshold, RSSI_A threshold), initiating a transaction with the terminal 403, following the protocol of the terminal 403 technology.

The communication threshold is preferably a minimum threshold for a transaction to take place in the technology.

As an example, for all types of terminal technology, the standby threshold corresponds to the communication threshold of the highest performing type of technology in terms of signal-to-noise ratio required for its decoding by the reader, e.g., the type of technology that requires the smallest value of signal-to-noise ratio. As an example, for all technology types in the terminal, the standby output threshold corresponds to the communication threshold of the FeliCa technology type or the 14443-B technology type. Preferably, the standby output threshold corresponds to the communication threshold of technology type 14443-B.

Thus, with the determination of the terminal 403 technology, prior to the communication, by the telephone 401 and the initiation of the RSSI for the terminal 403 technology, it is now possible to start a communication without waiting for the worst case.

The embodiments then allow a time saving in the establishment of the communication between the telephone 401 and the terminal 403. In particular, the time saving is all the more significant the lower the signal-to-noise ratio of the terminal 403 technology. As an example, the time savings for establishing a communication between the phone 401 and a terminal 403 of 14443-B technology will be greater than the time savings for establishing a communication between the phone 401 and a terminal 403 of FeliCa technology.

The embodiments further avoid communication errors at the range limit. Indeed, in some embodiments, a communication is established only if the signal level allows it for a given technology.

More generally, what has just been explained in relation to the validation of transport tickets applies to any type of application in which similar problems arise, for example, contactless payment applications, reading of product information, access control, etc. For all these applications, the speed of communication is of the essence. For all these applications, the speed of communication between devices is important.

FIG. 6 represents a flowchart illustrating a transaction process between two NFC devices.

The flowchart represented in FIG. 6 begins with a step in which it is checked whether (Block 601, VBAT>VBATDET) the phone battery (VBAT) has a charge greater than a previously determined battery limit value (VBATDET) and stored in the internal memory of the phone. The battery limit value is, for example, between 2.4 V and 3.2 V. The battery limit value is, for example, configurable in steps of 0.2 V. This condition is, for example, checked by a voltage supervision circuit VBAT present in the telephone.

Following step 601, the flowchart described in FIG. 6 unfolds as the distance d (FIG. 4), representative of the distance between the telephone and the terminal, decreases (block 603, Decrease of distance d). The present method relies on detecting the external field and its value as the distance d decreases.

If, after step 601, the telephone leaves the range of the validation terminal at any time, e.g., if the telephone moves away from the validation terminal so that the terminal is no longer within range of the telephone, the telephone returns to a so-called polling phase implementing the operation described in connection with FIG. 3.

Step 601 is otherwise followed by a loop in which the detected external field RSSI (Received Signal Strength Indicator) is monitored until the value of the field is greater than or equal to the value of a threshold called anti-collision threshold or threshold A (block 605, External field level≥Threshold A). As long as the value of the external field detected remains below the value of threshold A (output N of block 605), the telephone remains in the so-called polling state. As soon as, as the telephone approaches the terminal, the value of the external field detected exceeds the value of threshold A (output Y of block 605), the telephone stops its so-called polling phase (block 607, Stop Polling).

Step 607 is followed by a loop in which the detected external field is monitored until its value is greater than or equal to the value of a threshold known as the standby exit threshold or threshold B (block 609, External field level≥Threshold B). As long as the value of the external field detected remains below the value of threshold B (output N of block 609), the telephone remains in standby. As soon as the phone approaches the terminal, the value of the detected external field exceeds the value of threshold B (output Y of block 609), the phone enters a card emulation mode (block 611, Card emulation activation).

Step 611 is followed by a step 613 in which the technology type of the terminal is identified (Identify technology type), from the interrogation frame received from the terminal. The identification of the technology type of the terminal then allows the communication threshold or threshold C to be set up, in a step 615, as a function of this (Set up of threshold C), from which the telephone will respond to the terminal. The threshold C is set up from values stored in the non-volatile memory of the central unit 202 of the telephone. Indeed, for each type of modulation technology of the validation terminals, a value of the threshold C is stored in the non-volatile memory of the phone.

Step 615 is followed by a loop in which the detected external field is monitored until its value is greater than or equal to the threshold C value (block 617, External field level≥Threshold C). As long as the value of the detected external field remains below the value of threshold C (output N of block 617), the communication or transaction between the telephone and the terminal is not established (the terminal continues to transmit interrogation frames). As soon as the telephone approaches the terminal and the value of the external field detected exceeds the value of the threshold C (output Y of block 617), the telephone starts a communication or a transaction with the terminal in the protocol corresponding to the protocol of the type of technology of the terminal (block 619, Start transaction). Since the communication threshold is based on the type of technology of the terminal, the communication is activated as soon as possible during the movement of the phone towards the terminal. This speed helps to reduce the number of incomplete communications.

For example, the threshold C corresponds to a first threshold, threshold B corresponds to a second threshold, and threshold A corresponds to a third threshold.

One advantage of the described embodiments and implementation modes is that they allow for time savings in establishing communication between a first NFC device and a second NFC device configured in reader mode.

Another advantage of the described embodiments and implementation modes is that they allow the establishment of a communication in the technology protocol of the device configured in reader mode.

Yet another advantage of the described embodiments and implementation modes is that they allow to reduce the number of incomplete communications.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

A method implemented by a first NFC device (401), may be summarized as including the initiation of a transaction (619) with a second NFC device (403) configured in reader mode is performed when the signal level received by the first device, configured in card mode, reaches a first threshold (C), depending on the type of modulation technology of the second device.

A first device (401) may be summarized as including initiating a transaction (619) with a second NFC device (403) configured in reader mode when the signal level received by the first device, configured in card mode, reaches a first threshold (C), depending on the type of modulation technology of the second device.

Establishing the transaction (619) may be preceded by a step of determining (613), by the first device, the type of modulation technology of the second device.

The first threshold (C) may correspond to a received signal strength indicator threshold.

A value of the first threshold (C), for each type of modulation technology of the second device, may be stored in a non-volatile memory of the first device (401).

The establishment may be preceded by the following steps: detecting, by the first device (401), a field emitted by the second NFC device configured in reader mode; and switching (611) the first device to card mode when the received signal level reaches a second threshold (B).

The determining step (613) may occur before the detecting step.

The second threshold (B) may be less than the first threshold (C).

The second threshold (B) may correspond to the threshold of ISO 14443 type B technology.

The second threshold (B) may correspond to a threshold of FeliCa technology.

The first device (401) may exit an interrogation mode (607) of its environment when the received signal level reaches a third threshold (A), lower than the second threshold (605).

The second device (403) may be of the ISO 14443B type, the first threshold (C) corresponding to a minimum signal threshold for the setting of a transaction in ISO 14443B technology.

The second device (403) may be of the ISO 14443A type, the first threshold (C) corresponding to a minimum signal threshold for establishing a transaction in the ISO 14443A technology.

The second device (403) may be of the FeliCa 212 type, the first threshold (C) corresponding to a minimum signal threshold for establishing a transaction in the FeliCa 212 technology.

The second device (403) may be of the FeliCa 424 type, the first threshold (C) corresponding to a minimum signal threshold for establishing a transaction in the FeliCa 424 technology.

The first device (401) may be a smartphone.

The second device (403) may be a transport ticket reading terminal.

In some embodiments, a method implemented by a first NFC device (401), configured in card mode, may be summarized as including initiating a transaction (619) with a second NFC device (403) configured in reader mode.

The method includes a step of determining (613), by the first device (401), the type of modulation technology of the second device (403) from among several types of modulation technology.

The method includes a step of comparing the signal level received by the first device to a first threshold (C), depending on the type of modulation technology of the second device (403), communication being established when the signal level is above the first threshold.

In some embodiments, a first device (401) may be summarized as configured to determine the type of modulation technology of the second device (403), among several types of modulation technology, compare the level of the signal received with a first threshold (C) depending on the type of modulation technology of the second device (403), and establish a transaction (619) with a second NFC device (403) configured in reader mode when the signal level received by the first device, configured in card mode, reaches a first threshold (C).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
receiving, by a first Near-Field Communication (NFC) device, a first signal from a second NFC device and exiting, by the first NFC device, a polling mode in response to a level of the first signal exceeding a first threshold;
receiving, by the first NFC, a second signal from the second NFC device and switching, by the first NFC device, to operating in a card mode in response to the second signal exceeding a second threshold that is greater than the first threshold;
determining, by the first NFC device, a type of modulation technology of the second NFC device from a plurality of types of modulation technology and setting a third threshold depending on the type of modulation technology;
receiving a third signal by the first NFC device configured in card mode; and initiating a transaction between the first NFC device and the second NFC device configured in reader mode based on a level of the third signal reaching the third threshold.

2. The method according to claim 1, wherein the third threshold corresponds to a received signal strength indicator threshold.

3. The method according to claim 2, comprising:
detecting, by the first NFC device, a field emitted by the second NFC device configured in reader mode,
wherein the detecting and the switching precede initiating the transaction between the first NFC device and the second NFC device.

4. The method according to claim 3, wherein determining the type of modulation technology of the second NFC device occurs before detecting the field.

5. The method according to claim 1, comprising:
storing a value of the third threshold, for each type of modulation technology of the second NFC device, in a non-volatile memory of the first NFC device.

6. The method according to claim 1, wherein the second threshold is less than the third threshold.

7. The method according to claim 1, wherein the second threshold corresponds to the threshold of ISO 14443 type B technology.

8. The method according to claim 1, wherein the second NFC device is of an ISO 14443B type, the third threshold corresponds to a minimum signal threshold based on setting of a transaction in ISO 14443B technology.

9. A device comprising:
a near field communication circuit; and
an antenna coupled to the near field communication circuit, the antenna, in operation, receives signals;
wherein the near field communication circuit, in operation,
receives a first signal from a second NFC device and exits a polling mode in response to a level of the first signal exceeding a first threshold;
receives a second signal from the second NFC device and switches to operating in a card mode in response to the second signal exceeding a second threshold that is greater than the first threshold;
determines a type of modulation technology of the second NFC device from a plurality of types of modulation technology and sets a third threshold depending on the type of modulation technology; and
initiates a transaction with the second NFC device when a level of a third signal received through the antenna reaches a third threshold,
wherein the device is configured in card mode and the second NFC device is configured in reader mode.

10. The device according to claim 9, comprising:
a memory, the memory, in operation, stores a value of the third threshold, for each type of modulation technology of the second NFC device.

11. The device according to claim 9, the near field communication circuit, in operation:
detects a field emitted by the second NFC device configured in reader mode.

12. The device according to claim 9, wherein the second threshold corresponds to a threshold of FeliCa technology.

13. The device according to claim 9, wherein second NFC device is of an ISO 14443A type, the third threshold corresponding to a minimum signal threshold based on establishing a transaction in ISO 14443A technology.

14. A system comprising:
a first NFC device;
a second NFC device, the second NFC device communicatively coupled to the first NFC device;
wherein the first NFC device, in operation,
receives a first signal from the second NFC device and exits a polling mode in response to a level of the first signal exceeding a first threshold;
receives a second signal from the second NFC device and switches to operating in a card mode in response to the second signal exceeding a second threshold that is greater than the first threshold;
determines a type of modulation technology of the second NFC device from a plurality of types of modulation technology and sets a third threshold depending on the type of modulation technology; and
initiates a transaction with the second NFC device when a level of the signals received reaches a first threshold.

15. The system according to claim 14, comprising:
a memory, which, in operation, stores a value of the third threshold, for each type of modulation technology of the second NFC device.

16. The system according to claim 15, wherein the second NFC device is of a FeliCa 212 type, and the third threshold corresponds to a minimum signal threshold based on establishing a transaction in FeliCa 212 technology.

17. The system according to claim 15, wherein the second NFC device is of a FeliCa 424 type, the third threshold corresponds to a minimum signal threshold based on establishing a transaction in FeliCa 424 technology.

* * * * *